(12) United States Patent
Lee et al.

(10) Patent No.: US 10,222,533 B2
(45) Date of Patent: Mar. 5, 2019

(54) BACKLIGHT UNIT AND DISPLAY DEVICE COMPRISING SAME

(71) Applicant: KOOKMIN UNIVERSITY INDUSTRY ACADEMY COOPERATION FOUNDATION, Seoul (KR)

(72) Inventors: Jae Gab Lee, Seoul (KR); Hoe Sub Soh, Seongnam-si (KR); Jin Hyuk Kwon, Daegu (KR)

(73) Assignee: Kookmin University Industry Academy Cooperation Foundation, Seoul (KR)

( * ) Notice: Subject to any disclaimer, the term of this patent is extended or adjusted under 35 U.S.C. 154(b) by 49 days.

(21) Appl. No.: 15/302,965

(22) PCT Filed: Apr. 6, 2015

(86) PCT No.: PCT/KR2015/003402
§ 371 (c)(1),
(2) Date: Oct. 7, 2016

(87) PCT Pub. No.: WO2015/156548
PCT Pub. Date: Oct. 15, 2015

(65) Prior Publication Data
US 2017/0031084 A1 Feb. 2, 2017

(30) Foreign Application Priority Data

Apr. 9, 2014 (KR) .......................... 10-2014-0042364
Apr. 9, 2014 (KR) .......................... 10-2014-0042365

(Continued)

(51) Int. Cl.
*F21V 8/00* (2006.01)
*G02B 5/02* (2006.01)
*G02B 5/04* (2006.01)

(52) U.S. Cl.
CPC .............. *G02B 6/0036* (2013.01); *G02B 5/02* (2013.01); *G02B 5/04* (2013.01); *G02B 6/005* (2013.01)

(58) Field of Classification Search
CPC .......... G02B 6/0036; G02B 5/02; G02B 5/04; G02B 6/005; G02B 6/0033; G02B 5/0215;
(Continued)

(56) References Cited

U.S. PATENT DOCUMENTS 5,396,350 A * 3/1995 Beeson ..................... F21V 5/02
349/62
5,555,109 A * 9/1996 Zimmerman ............. F21V 5/02
349/112
(Continued)

FOREIGN PATENT DOCUMENTS

JP 2001-051272 A 2/2001
JP 2005-103947 A 4/2005
(Continued)

OTHER PUBLICATIONS

International Search Report in International Application No. PCT/KR2015/003402 dated Jul. 2, 2015.
(Continued)

*Primary Examiner* — Bao Q Truong
(74) *Attorney, Agent, or Firm* — Knobbe Martens Olson & Bear LLP

(57) ABSTRACT

The described technology relates to a backlight unit and a display device including the backlight unit. In one aspect, the backlight unit includes a light source and a light guiding plate configured to guide light emitted from the light source. The backlight unit also includes an optical sheet integrally
(Continued)

formed with the light guiding plate and including a micro pattern configured to emit light reflected from the light guiding plate.

13 Claims, 8 Drawing Sheets

(30) Foreign Application Priority Data

Apr. 9, 2014 (KR) .................. 10-2014-0042366
Apr. 9, 2014 (KR) .................. 10-2014-0042367

(58) Field of Classification Search
CPC ....... G02B 6/0035; G02B 6/0051; F21V 8/00; F21V 5/002; F21V 5/005; F21V 2200/20; G02F 1/133615
See application file for complete search history.

(56) References Cited

U.S. PATENT DOCUMENTS

| | | | | |
|---|---|---|---|---|
| 7,001,060 B1* | 2/2006 | Kimura | ............... | G02B 6/0053 349/63 |
| 7,720,347 B2* | 5/2010 | Lee | ................ | G02B 6/0038 349/56 |
| 7,997,783 B2* | 8/2011 | Song | ................ | G02B 6/0036 362/339 |
| 2004/0263451 A1* | 12/2004 | Muto | .............. | G02B 6/005 345/87 |
| 2006/0262666 A1 | 11/2006 | Paek et al. | | |

FOREIGN PATENT DOCUMENTS

| | | |
|---|---|---|
| JP | 2009-117304 A | 5/2009 |
| JP | 2011-215399 A | 10/2011 |
| KR | 10-2006-0119342 A | 11/2006 |
| KR | 10-2008-0004135 A | 1/2008 |
| KR | 10-2009-0030455 A | 3/2009 |
| KR | 10-2010-0116523 A | 11/2010 |
| KR | 10-2012-0036293 A | 4/2012 |
| KR | 10-2013-0026074 A | 3/2013 |
| KR | 10-1286095 B1 | 7/2013 |

OTHER PUBLICATIONS

Notice of Allowance in Korean Application No. KR 10-2014-0042364 dated Nov. 26, 2015.
Office Action in Korean Application No. KR 10-2014-0042365 dated Mar. 23, 2015.

* cited by examiner

[Fig. 1]
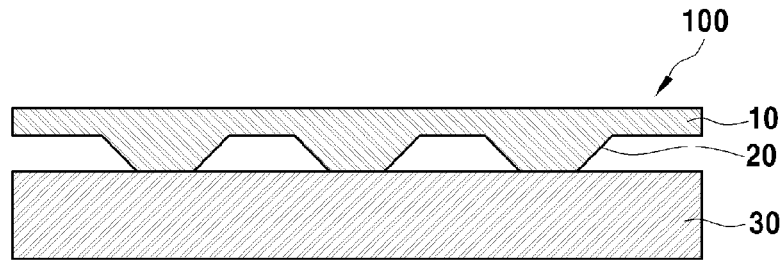
[Fig. 2]
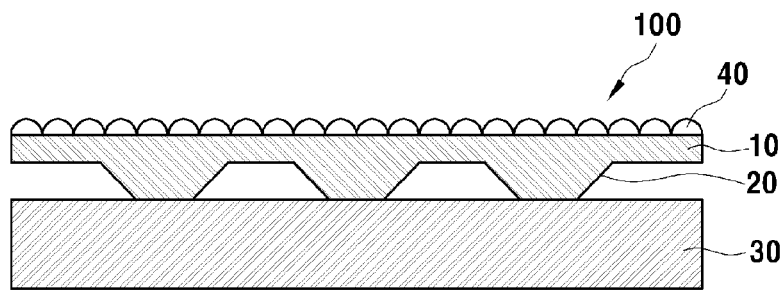
[Fig. 3]
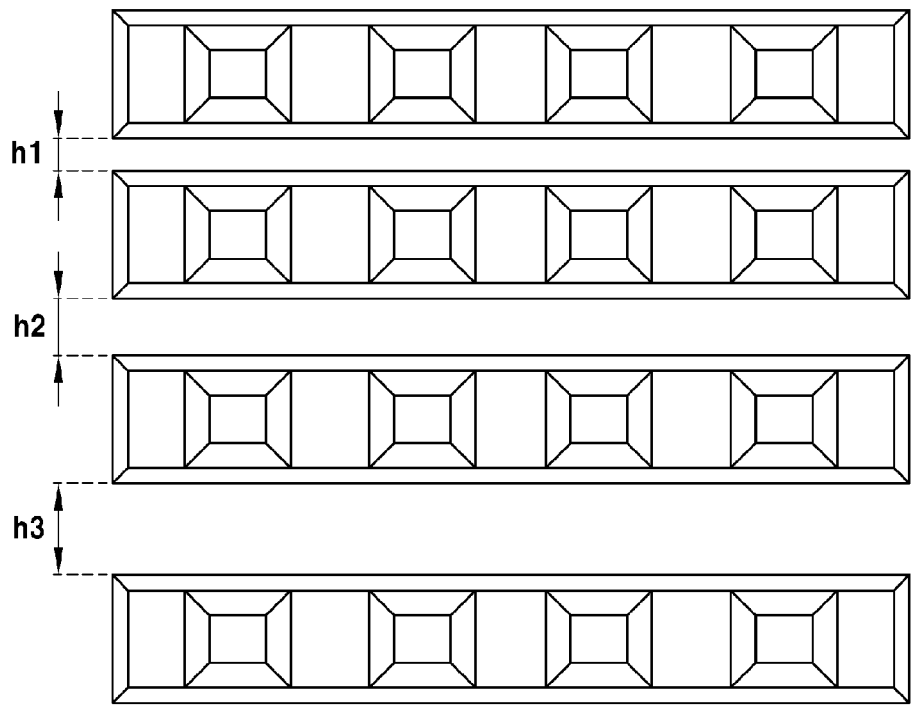

[Fig. 4]
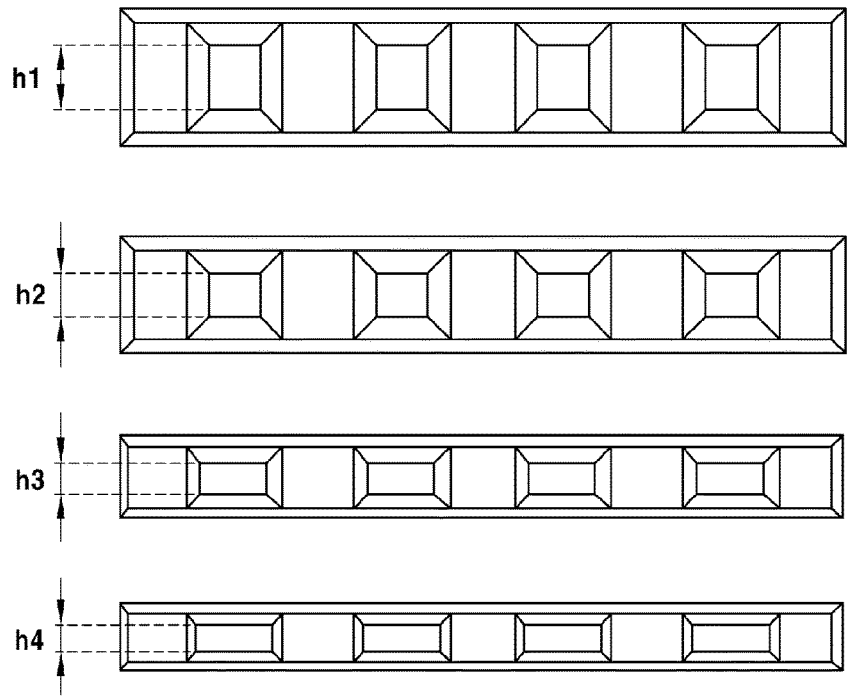
[Fig. 5]
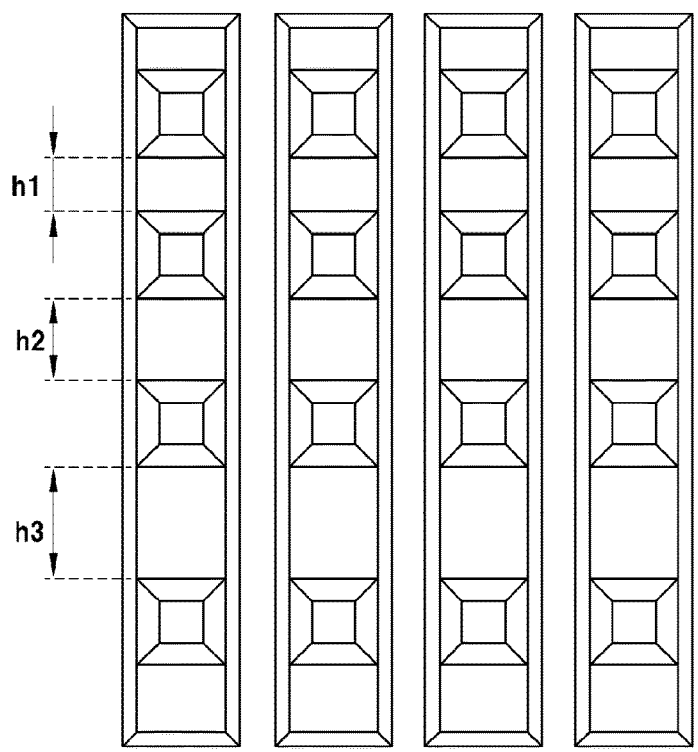

[Fig. 6]
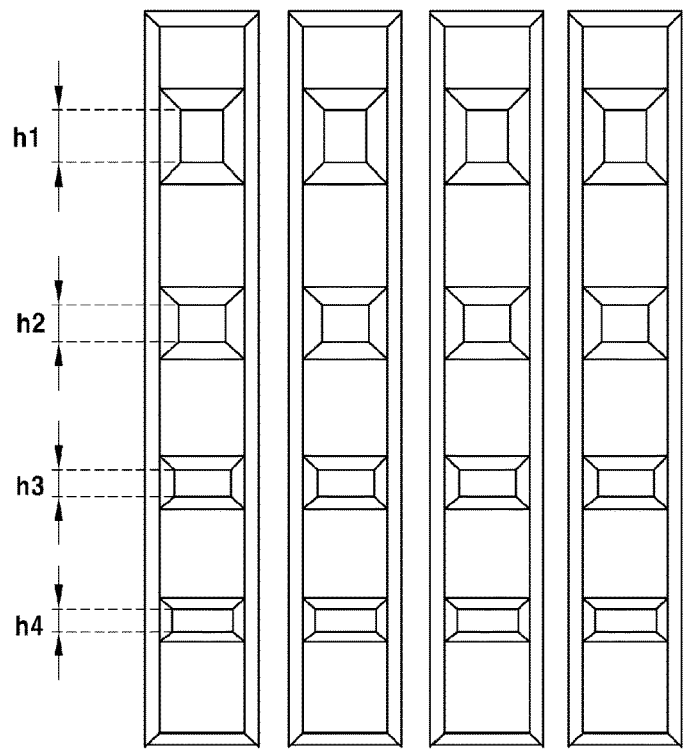
[Fig. 7a]
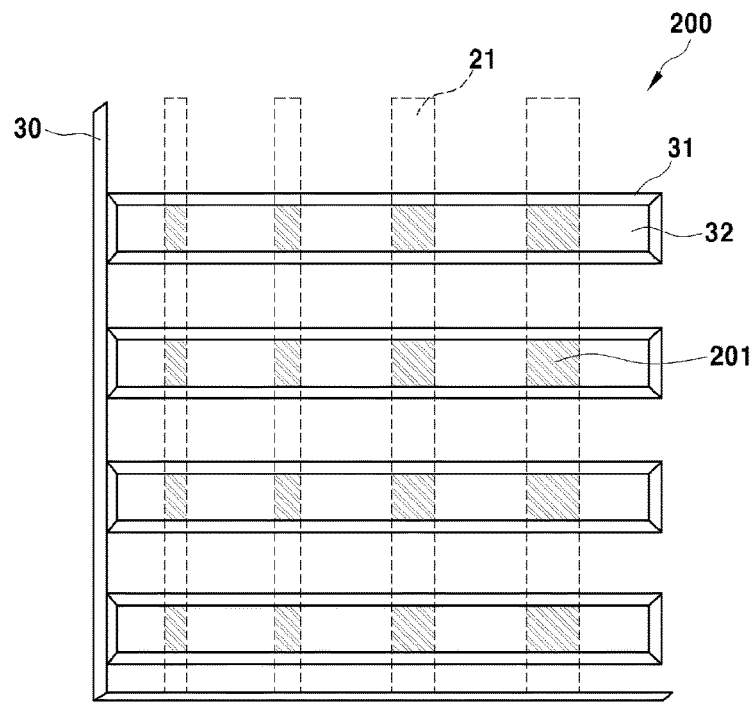

[Fig. 7b]
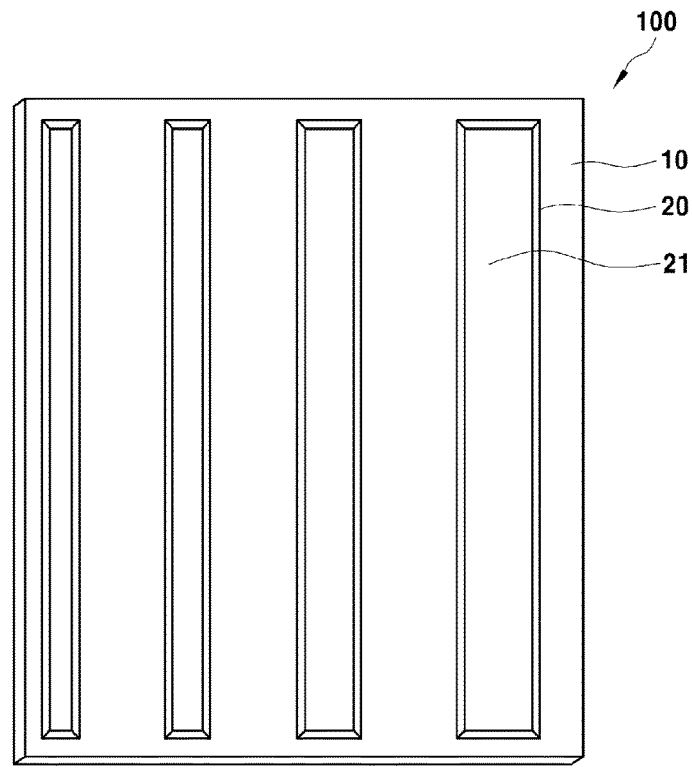
[Fig. 8a]
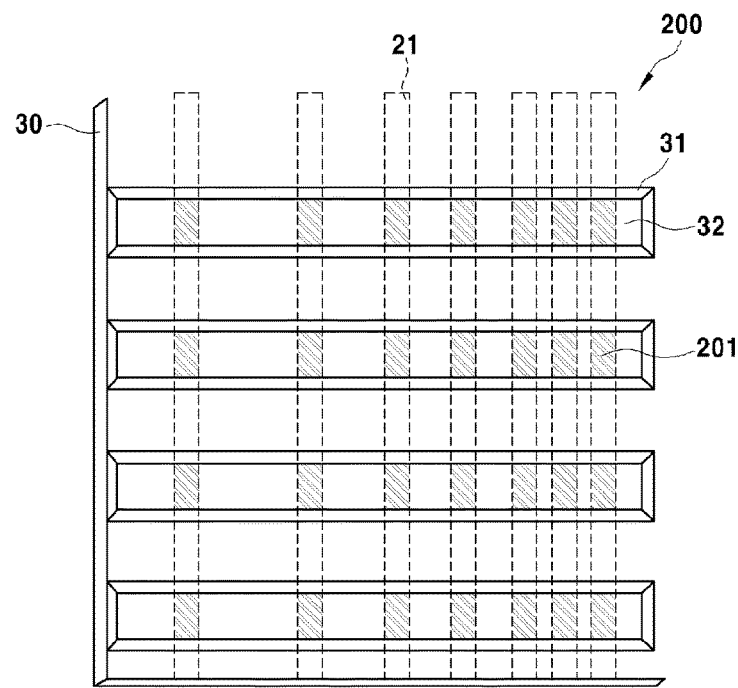

[Fig. 8b]
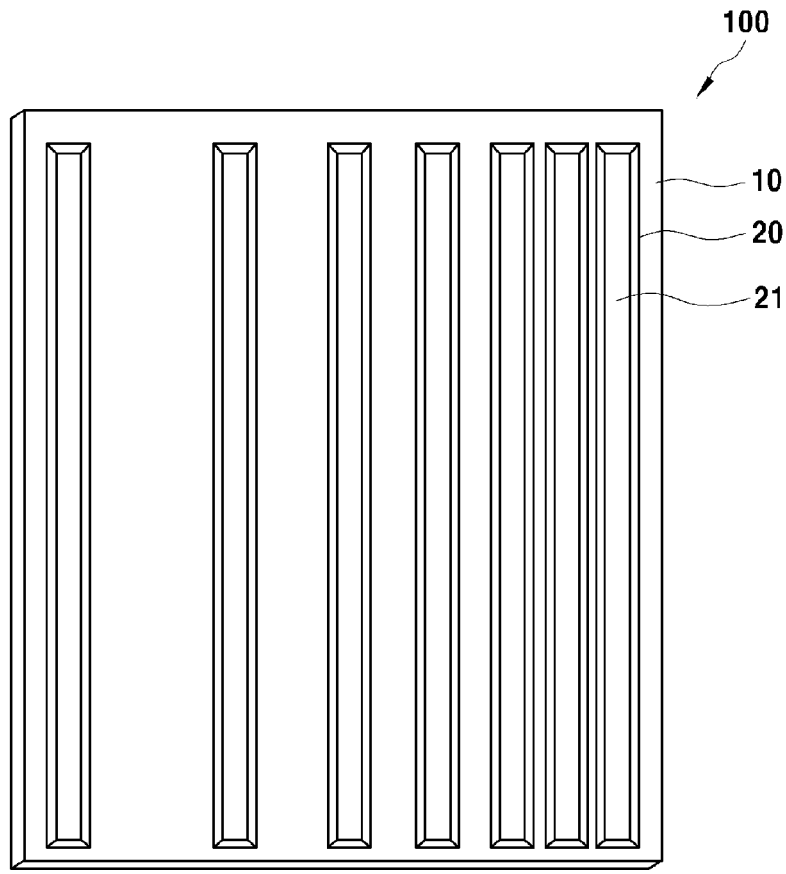
[Fig. 9]
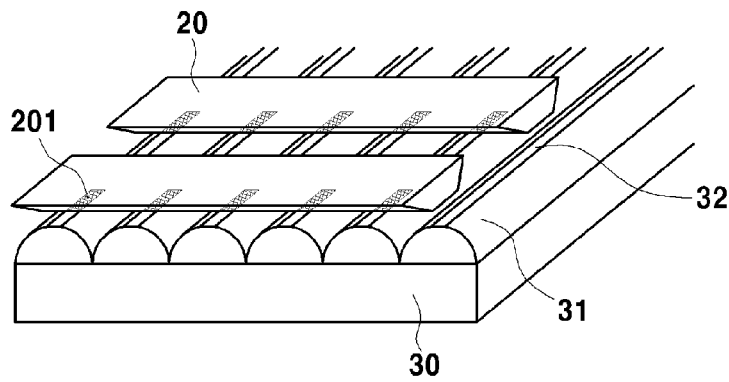

[Fig. 10a]
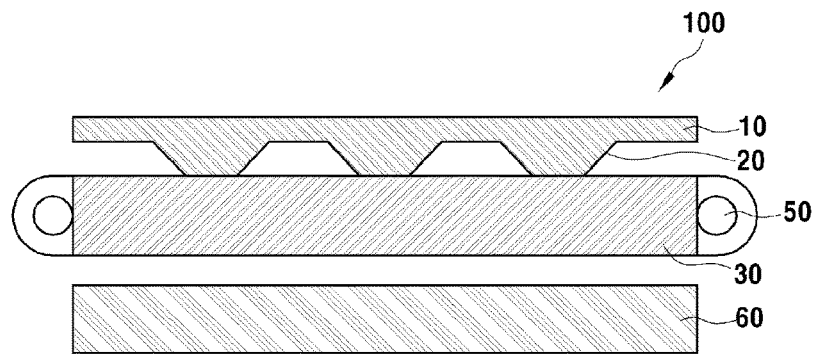
[Fig. 10b]
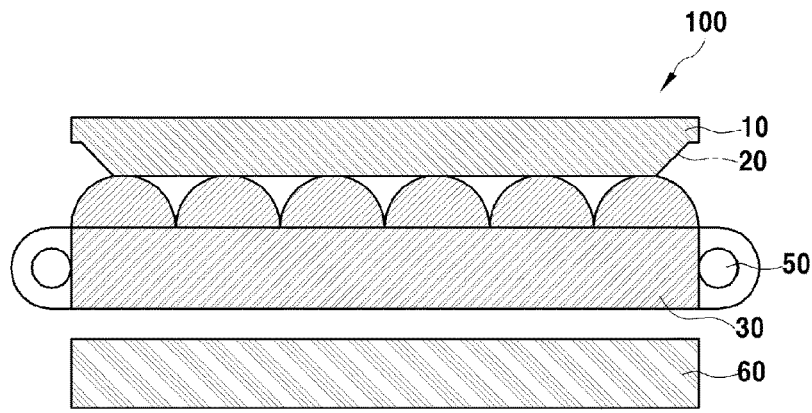
[Fig. 11]
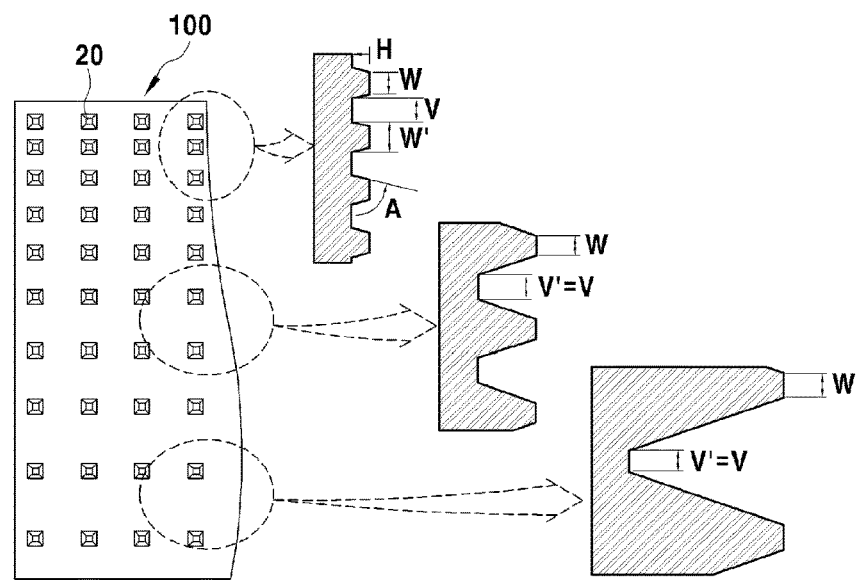

[Fig. 12]
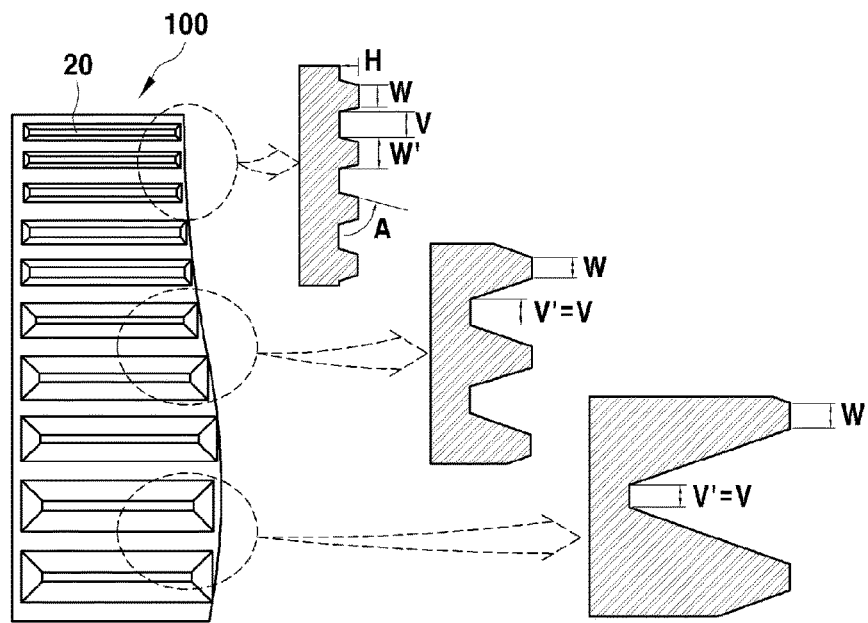

[FIG. 13]
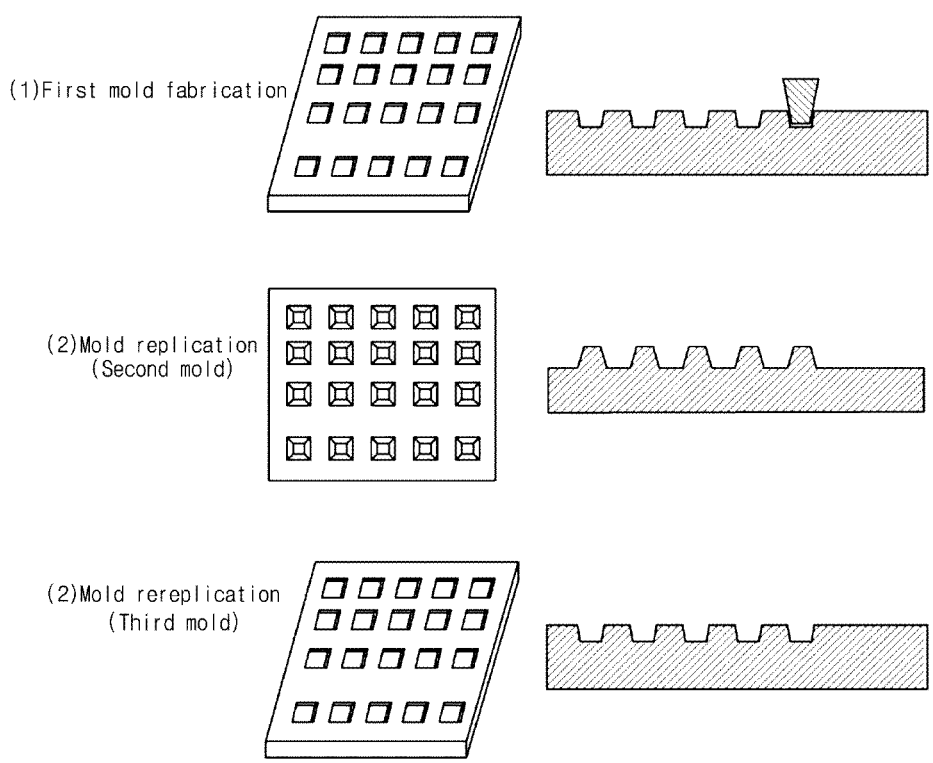

BACKLIGHT UNIT AND DISPLAY DEVICE COMPRISING SAME

CROSS REFERENCE TO RELATED APPLICATIONS

Any and all priority claims identified in the Application Data Sheet, or any correction thereto, are hereby incorporated by reference under 37 CFR 1.57. For example, this application is a U.S. National Phase of International Application No. PCT/KR2015/003402, filed on Apr. 6, 2015. PCT/KR2015/003402 claims priority to and the benefit of Korean Patent Application No. 10-2014-0042364 filed on Apr. 9, 2014, Korean Patent Application No. 10-2014-0042365 filed on Apr. 9, 2014, Korean Patent Application No. 10-2014-0042366 filed on Apr. 9, 2014, and Korean Patent Application No. 10-2014-0042367 filed on Apr. 9, 2014, each of which is hereby incorporated by reference in their entireties.

BACKGROUND

Technical Field

The present invention relates to a backlight unit and a display device comprising the backlight unit.

Background Art

Recently, as various portable electronic devices, such as mobile phones, personal digital assistants (PDAs), and notebook computers, develop, need for a light, thin, short, and small flat panel display device applicable to such devices has been gradually increasing. As these flat panel display devices, liquid crystal displays (LCDs), plasma display panels (PDPs), field emission displays (FEDs), vacuum fluorescent displays (VFDs), and the like are actively being studied, and currently, among them, LCDs in particular have the spotlight because of a mass-production technology, availability of a driving unit, implementation of high definition, implementation of a large screen, and the like.

An LCD device displays an image using liquid crystals interposed between two sheets of electrodes. However, liquid crystals included in a display device of an LCD device do not emit light by themselves and only perform a function of simply transmitting or blocking light according to an applied electric signal. Therefore, to display information on a liquid crystal panel, a so-called backlight unit (BLU), which is a planar light emitting device for irradiating light onto a rear surface of the liquid crystal panel, should be specially included in an LCD device. It is preferable that the BLU increase luminance of light, form a uniform planar light source, and uniformly irradiate the liquid crystal panel, and these characteristics are very important in terms of product quality.

Generally, various parts, such as a lamp as a light source, a light guiding plate (or a light wave guide), a reflection sheet, a diffusion sheet, a prism sheet, a protection sheet, and the like, compose one BLU. Here, the light guiding plate serves to uniformly guide light from the light source in all directions, the reflection sheet serves to reflect light passing through a bottom surface of the light guiding plate and return the light, the diffusion sheet serves to diffuse light and uniformize luminance of the light, and the prism sheet refracts light in upward, downward, leftward, and rightward directions and concentrates the light to enhance its luminance. Further, the protection sheet serves to protect the prism sheet so that foreign material such as dust does not contaminate in a groove between peaks of the prism sheet, and serves to prevent the prism sheet from being scratched.

A conventional BLU uses a diffusion sheet in association with a prism sheet to uniformize luminance of light and increase light efficiency. When the diffusion sheet and the prism sheet are separately provided as thus, there may be problems in that not only fabrication of a light, thin, short, and small BLU is difficult due to an increase in the number of parts, but a defect rate increases and a product cost increases due to an increase in the number of assembly processes.

However, considering that a BLU is an element which has the greatest effect on the entire thickness of an LCD device, in the BLU according to the Korean Publication Laid-open Patent 2008-0004135, there are too many elements and there is a problem in that thinness and lightness of an LCD device is difficult to achieve.

SUMMARY

The present invention is directed to providing a backlight unit and a display device including the backlight unit.

However, problems to be solved by the present invention are not limited to the problems mentioned above, and other problems not mentioned above should be clearly understood by those skilled in the art.

A first aspect of the present invention provides a backlight unit including a light source, a light guiding plate configured to guide light emitted from the light source, and an optical sheet integrally formed with the light guiding plate and including a micro pattern configured to emit light reflected from the light guiding plate.

A second aspect of the present invention provides a display device including the backlight unit according to the first aspect.

A third aspect of the present invention provides a method of fabricating an optical sheet including forming a dimple on a surface of a prototype mold, fabricating a replicated mold by replicating the prototype mold more than one time, and fabricating an optical sheet including a micro pattern using the replicated mold.

According to one embodiment of the present invention, a backlight can be fabricated without an addition of a separate prism sheet or a diffusion sheet by coupling a light guiding plate, in which a micro lenticular pattern or a micro prism pattern is formed, to one optical sheet, and therefore, there is an advantage in that a backlight having minimal parts can be produced. Particularly, in a structure of the light guiding plate according to one embodiment of the present invention, light incident on an inside of the light guiding plate corresponds to a total reflection condition on both top and bottom surfaces of the light guiding plate, and therefore there is almost no loss of light. Further, a structure of the backlight unit (BLU) may have a minimal number of light interfaces, and therefore there is an advantage in that light utilization efficiency can be maximized.

According to one embodiment of the present invention, as a size of the BLU increases and a size of the light guiding plate increases, density difference of a structure formed on the optical sheet can be generated with respect to positions between an incident portion and a terminal portion of the light source. In this case, a problem of micro pattern visibility is eliminated, and a uniform quality of a planar light source can be enhanced. Particularly, by integrally forming the optical sheet and the light guiding plate and removing a diffusion sheet and a prism sheet, miniaturization and thinness of the BLU can be realized.

According to one embodiment of the present invention, a light extraction structure with high efficiency which avoids a method of light scattering is implemented, and since the optical sheet according to the present invention is coupled to the light guiding plate, a BLU can be fabricated with low cost because a diffusion sheet and a prism sheet do not need additionally. Further, when implementing a precise structure using a cutting process, a long time and attention is required to process a mold. However, the time and the cost of fabricating the mold can be reduced using punching, sealing, and laser machining according to the present invention.

According to one embodiment of the present invention, in the fabrication of the optical sheet, a fabrication of a special mold having a flexible portion is not necessary, and therefore a cost and a price of fabricating the special mold can be saved. In addition, the optical sheet includes three flat planes with elevation differences including an original plane, a first process plane of a lower surface of a pyramid, and a second process plane of the lower surface of a pyramid. Therefore, process trails do not appear, it is possible for a burying depth of imprinting to have an elevation difference, and a generation of an imprint bubble is eliminated by disposing a deep valley in a direction of a train, and therefore a high-quality optical sheet can be formed. In addition, a process depth in one direction of a horizontal direction and a vertical direction can be smaller, and a mold fabrication can be facilitated and a process time can be decreased. Further, according to one embodiment of the present invention, the BLU may have a structure in which a cost saving effect is great, and theoretically light efficiency is maximized by coupling the optical sheet according to the present invention to a non-patterned light guiding plate, compared to a conventional BLU in which three pieces of prism sheets and diffusion sheets are used. Accordingly, an innovative increase in the light efficiency can be expected.

BRIEF DESCRIPTION OF THE DRAWINGS

FIG. 1 is a cross-sectional view illustrating a backlight unit in which an optical sheet is formed on one side surface of a light guiding plate according to one embodiment of the present invention.

FIG. 2 is a cross-sectional view illustrating a light guiding plate coupled to an optical sheet in which one side surface has a surface illumination according to one embodiment of the present invention.

FIG. 3 is a schematic diagram illustrating a pyramid train according to one embodiment of the present invention.

FIG. 4 is a schematic diagram illustrating a pyramid train according to one embodiment of the present invention.

FIG. 5 is a schematic diagram illustrating a pyramid train according to one embodiment of the present invention.

FIG. 6 is a schematic diagram illustrating a pyramid train according to one embodiment of the present invention.

FIGS. 7A and 7B are a schematic diagram illustrating a light guiding plate and a light trail and a schematic diagram illustrating a structure of an optical sheet according to one embodiment of the present invention, respectively.

FIGS. 8A and 8B are a schematic diagram illustrating a light guiding plate and a light trail and a schematic diagram illustrating a structure of an optical sheet according to one embodiment of the present invention, respectively.

FIG. 9 is a schematic diagram illustrating a structure in which a light guiding plate is coupled to an optical sheet according to one embodiment of the present invention.

FIGS. 10A and 10B are schematic cross-sectional views illustrating backlight units according to one embodiment of the present invention.

FIG. 11 is a schematic diagram illustrating an optical sheet in which micro patterns are formed and structures of the micro patterns for each position according to one embodiment of the present invention.

FIG. 12 is a schematic diagram illustrating an optical sheet in which micro patterns are formed and structures of the micro patterns for each position according to one embodiment of the present invention.

FIG. 13 is a schematic diagram illustrating a method of fabricating an optical sheet according to one embodiment of the present invention.

DETAILED DESCRIPTION

Hereinafter, embodiments of the present invention are described below in sufficient detail so that those of ordinary skill in the art can embody and practice the inventive concept. However, the present invention is not limited to the embodiments disclosed and may be implemented in various different forms. Further, in the drawings, portions irrelevant to the descriptions are omitted in order to clearly describe the present invention, and the same or corresponding elements will be given the same reference numbers throughout the specification.

Throughout the entire specification, it should be understood that when an element is referred to as being "connected" or "coupled" to another element, it can be directly connected to the another element or may be electrically coupled to the other element with intervening elements.

Throughout the entire specification, it should be understood that when a first element is referred to as being "on" a second element, the first element may be directly on the second element, or a third element may be interposed between the first element and the second element.

Throughout the entire specification, it should be further understood that the terms "comprises" and/or "comprising" specify the presence of stated elements when used in this specification, but do not preclude the presence or addition of one or more other elements. The terms "about," "actually," and the like, which are terminologies of degree, used throughout the entire specification are used as a meaning of a value or of a close value to the value when a fabrication tolerance or material tolerance inherent to the mentioned term are presented, and are used to prevent an unconscientious infringer from unfairly using the described content in which an exact or absolute value is mentioned to facilitate comprehension of this specification. The term "(~ing) step" or "step of ~" used throughout the entire specification does not mean "step for ~."

Throughout the entire specification, of the term "combination thereof" included in an expression of the Markush form refers to a mix or a combination of one or more selected from a group including elements described in the expression of the Markush form, and refers to a combination which includes one or more selected from the group including the elements.

Throughout the entire specification, the term "A and/or B" refers to the term "A or B" or "A and B."

Throughout the entire specification, the term "light guiding plate" is a component performing a function of illuminating a backlight unit and uniformizing illumination, and specifically refers to an acryl injection molded product assembled inside of the backlight unit and guides light toward liquid crystals in a liquid crystal display (LCD)

device, and the light guiding plate serves to uniformly transfer light emitted from a light source toward an entire surface of the LCD device, but the present invention may not be limited thereto.

Throughout the entire specification, the term "micro pattern" refers to the term "micro pattern of a nano-size" or "micro pattern of a micro-size." The micro pattern includes a truncated cone shape, a truncated poly-pyramid shape, a pyramid shape, a prism shape, a lenticular shape, or the like, the micro pattern of the nano-size may include a size of about 1 nm to about 999 nm, and the micro pattern of the micro-size may include a size of about 1 µm to about 1,000 µm.

Throughout the entire specification, the term "lenticular" refers to the term "cylindrical shapes arranged in parallel over many rows," and may be implemented as a three-dimensional effect or a transformation according to a viewing angle, and therefore may be used as a monitor, a lens of a stereo picture and the like, a film, a sheet, and the like, but may not be limited thereto.

Throughout the entire specification, the term "pyramid train" refers to the term "micro patterns of a nano-size" or "micro patterns of a micro-size arranged in series in one dimension." The micro pattern includes a truncated cone shape, a truncated poly-pyramid shape, a pyramid shape, a prism shape, a lenticular shape, or the like, the micro pattern of the nano-size may include a size of about 1 nm to about 999 nm, and the micro pattern of the micro-size may include a size of about 1 µm to about 1,000 µm.

Throughout the entire specification, the term "dimple" refers to the term "plurality of depressions in a crater shape."

Hereinafter, example embodiments of the present invention will be described in detail with reference to the attached drawings. However, the present invention is not limited to the embodiments and drawings.

A first aspect of the present invention provides a backlight unit including a light source, a light guiding plate configured to guide light emitted from the light source, and an optical sheet integrally formed with the light guiding plate and including micro patterns configured to emit light reflected from the light guiding plate.

In regard to the above, FIG. 1 is a cross-sectional view illustrating a backlight unit in which an optical sheet is formed on one side surface of a light guiding plate according to one embodiment of the present invention. As shown in FIG. 1, the backlight unit according to the present invention may have an optical sheet 100 formed on one side surface of a light guiding plate 30, but may not be limited thereto.

According to one embodiment of the present invention, the optical sheet 100 may include a base material 10 and micro patterns 20 formed on the base material 10.

According to one embodiment of the present invention, the optical sheet 100 including the micro patterns 20 includes a function of diffusing light in addition to an inherent function of increasing luminance by refracting and concentrating light.

According to one embodiment of the present invention, the base material 10 of the optical sheet 100 may be a planar base material formed of a transparent material that may transmit light. For example, the base material 10 may include one selected from a polycarbonate series, a polysulfone series, a polyacrylate series, a polystyrene series, a polyvinylchloride series, a polyvinylalcohol series, a polynorbornene series, a polyester series, polyurethane, polyethyleneterephtalate, polyethylenenaphtalate, and combinations thereof, but may not be limited thereto.

The base material 10 may be a base material having a typical thickness used in the optical sheet 100 of the backlight unit, and the thickness of the base material 10 may be in a range of about 10 µm to about 2,000 µm, but may not be limited thereto. For example, the base material 10 may have a thickness of about 10 µm to about 2,000 µm, about 10 µm to about 1,800 µm, about 10 µm to about 1,600 µm, about 10 µm to about 1,400 µm, about 10 µm to about 1,200 µm, about 10 µm to about 1,000 µm, about 10 µm to about 800 µm, about 10 µm to about 600 µm, about 10 µm to about 400 µm, about 10 µm to about 200 µm, about 10 µm to about 100 µm, about 10 µm to about 50 µm, but the thickness may not be limited thereto. The base material 10 may have an excellent mechanical strength, thermal stability, a proper flexibility, and low loss of a transmitted light when the thickness is in the range described above. That is, the mechanical strength may be low under about 10 µm, and µ there may be a mechanical and optical problem when implementing a thin film of a display over about 2,000 µm.

According to one embodiment of the present invention, each of the micro patterns may include a shape selected from a group including a plurality of truncated cones, a plurality of truncated poly-pyramids, a plurality of pyramids, a plurality of prisms, a plurality of lenticulars, and combinations thereof, but may not be limited thereto.

According to one embodiment of the present invention, as shown in FIG. 2, a surface profile 40 may be formed on a side surface of the base material 10 on which the micro patterns 20 are not formed, but may not be limited thereto.

According to one embodiment of the present invention, the optical sheet 100 including the micro patterns 20 may include a shape selected from a group including a circular shape, an oval shape, a polygonal shape, and combinations thereof, but may not be limited thereto.

According to one embodiment of the present invention, the micro patterns 20 formed on the optical sheet 100 may include a flat-top having a planar shape and a side surface having a constant angle, but may not be limited thereto.

According to one embodiment of the present invention, the micro patterns 20 formed on the optical sheet 100 may have a shape in which each micro pattern includes side walls having an elevation angle A, but may not be limited thereto. The elevation angle A includes a measured numerical value of a gradient of each micro pattern 20 on the basis of the optical sheet 100.

According to one embodiment of the present invention, the elevation angle A of a side surface of each micro pattern 20 may be in a range of about 45° to about 80°, but may not be limited thereto. For example, the elevation angle A of the side surface of each micro pattern 20 may be in a range of about 45° to about 80°, about 45° to about 80°, about 50° to about 80°, about 55° to about 80°, about 60° to about 80°, about 65° to about 80°, about 70° to about 80°, about 75° to about 80°, about 45° to about 75°, about 45° to about 70°, about 45° to about 65°, about 45° to about 60°, about 45° to about 55°, about 45° to about 50°, but may not be limited thereto.

According to one embodiment of the present invention, the optical sheet 100 may include a pyramid train in which pyramid shapes are disposed in series in one dimension on one side surface of the base material 10, but may not be limited thereto.

For example, the pyramid train may be formed on the one side surface of the base material 10 using an imprinting process or may be formed by bonding a pyramid train fabricated by a precise lathing process to the one side surface of the base material 10, but the pyramid train may not be limited thereto. For example, fabricating the optical sheet including the pyramid train using a nanoimprint lithography method may include preparing a mold for imprinting, such as silicon on which a desired pattern is formed by a precise lathing process, to face the base material 10, putting the base material 10 and the mold between press panels, treating them at high temperature and high pressure, separating the base material 10 from the mold, and transferring a mold pattern onto the base material 10. Nanoimprint lithography is able to implement an ultrafine pattern by using a rigid mold such as silicon.

According to one embodiment of the present invention, when the optical sheet 100 includes the pyramid train, a pyramid train having functions of not only refracting and concentrating light but also of diffusing the light may be disposed in parallel on the one side surface of the base material 10 of the optical sheet 100. For example, the pyramid train may include pyramids in which pyramid shapes are disposed in series in one dimension, and the pyramid may include a shape selected from a group including a truncated cone, a truncated poly-pyramid, and combinations thereof, but may not be limited thereto.

According to one embodiment of the present invention, the pyramid train may include pyramids disposed in a horizontal direction with the same size and/or the same gap, but may not be limited thereto.

According to one embodiment of the present invention, the pyramid train may include pyramids disposed in a vertical direction with a different size and/or a different gap, but may not be limited thereto. For example, the gap may be different based on a size of the backlight unit and/or an optical simulation.

According to one embodiment of the present invention, the optical sheet 100 including the pyramid train may have three flat surfaces which are the base material 10, a pyramid bottom surface, and a pyramid train bottom surface, but the optical sheet 100 may not be limited thereto. When the optical sheet 100 has a single process plane, a bite cutting process is performed in horizontal and vertical directions, after the bite cutting process in the horizontal and vertical directions is performed, process trails left on a cutting panel may be uncontrollable and the process trails may have an effect on a luminance uniformity of the backlight unit (BLU). Further, to complete the cutting process in the horizontal and vertical directions, an entire extended distance of the cutting process may be great, and a process time may be long. However, according to one embodiment of the present invention, when the optical sheet 100 has two process planes having a difference of elevation, process trails may be removed, it may be possible for a burying depth of an imprint to have a difference of elevation, and generation of an imprint bubble may be eliminated by disposing a deep valley in a direction of the train, and therefore a high quality optical sheet may be fabricated. In addition, a process depth in one direction between the horizontal direction and the vertical direction may be smaller, a mold fabrication may be easy, and a process time may be decreased.

According to one embodiment of the present invention, the light guiding plate 30 serves to guide light supplied by a light source to an LCD panel side, and may include a material of a plastic series such as acryl which is a light transmitting material capable of transmitting light, but the light guiding plate 30 may not be limited thereto. For example, the light guiding plate 30 may include one selected from a group including a polymethylmethacrylate (PMMA) series, polycarbonate (PC), polyacrylate (PA), polyurethane, a transparent resin of olefin series, and combinations thereof, but may not be limited thereto. For example, when the light guiding plate 30 uses the PMMA series which has excellent weatherproofing and coloring, a mechanical strength is high and the light guiding plate 30 may not be easily broken and changed, it may be light, and may have a high chemical resistance and a low absorptivity of a light in a visible ray region, and therefore the light guiding plate 30 may have an excellent transparency and gloss. For example, when a transparent resin of the olefin series is used which has a specific gravity of about 1, lightness of the BLU according to the present invention may be realized.

According to one embodiment of the present invention, the light guiding plate 30 may be a non-patterned light guiding plate or a patterned light guiding plate, but may not be limited thereto.

According to one embodiment of the present invention, when a non-patterned light guiding plate is used as the light guiding plate 30, total reflection is generated on the non-patterned light guiding plate in the conventional art, and thus the non-patterned light guiding plate is not usable due to the total reflection property. However, according to one embodiment of the present invention, the BLU may be fabricated without a loss of light regardless of a total reflection property of the non-patterned light guiding plate by combining an optical sheet with the non-patterned light guiding plate.

According to one embodiment of the present invention, when a patterned light guiding plate is used as the light guiding plate 30, a pattern of the patterned light guiding plate may include a lenticular pattern or a prism pattern, but may not be limited thereto. For example, the micro prism may be a prism pattern of a plurality of polygonal shapes formed on the light guiding plate. The pattern of the patterned light guiding plate may include a shape selected from a group including a lenticular pattern, a prism pattern, and combinations thereof, but may not be limited thereto.

According to one embodiment of the present invention, as shown in FIGS. 7A and 8A, the light guiding plate 30 may be a rectangular panel shape, and therefore, the light guiding plate 30 may have a front surface, a rear surface, and four side surfaces, and the lenticular pattern or the prism pattern may be disposed on the front surface or on the rear surface except the side surfaces, but the light guiding plate 30 may not be limited thereto.

According to one embodiment of the present invention, the lenticular pattern or the prism pattern of the patterned light guiding plate may include a flat-top having a planar shape, and a side surface of the lenticular pattern or the prism pattern may include a planar shape having a constant slope or a curved surface shape, but the shapes may not be limited thereto.

According to one embodiment of the present invention, FIGS. 7B and 8B are schematic diagrams each illustrating a structure of the optical sheet 100 according to one embodiment of the present invention. According to one embodiment of the present invention, each micro pattern 20 formed in the optical sheet 100 may include flat-tops 21 having a planar shape, and a side surface of the lenticular pattern or the prism pattern may have a constant slope, but may the shapes not be limited thereto.

According to one embodiment of the present invention, integrally forming the optical sheet 100 with the light guiding plate 30 is performed by crossing the light guiding plate 30 with the optical sheet 100, but may not be limited thereto.

For example, when the light guiding plate 30 and the optical sheet 100 are coupled by crossing the light guiding plate 30 with the optical sheet 100, light trails 200 may be formed at contact points of the light guiding plate 30 and the optical sheet 100. The light trails 200 may be formed by a constant gap or an irregular gap with which the lenticular pattern or a prism pattern 31 formed on one surface of the light guiding plate 30 is disposed, or may be formed on a side of a light emitting surface. The light trails 200 may have a function of controlling light incident from a light source located on a side surface of the light guiding plate 30 from deviating from its propagation direction by the lenticular pattern or the prism pattern 31 of the light guiding plate 30, but may not be limited thereto.

According to one embodiment of the present invention, the flat-tops 21 denoted by dotted lines in FIGS. 7A and 8A represents a case in which the micro patterns 20 are formed in the optical sheet 100 as shown in FIGS. 7B and 8B, and the lenticular pattern or the prism pattern 31 formed on the light guiding plate 30 are cross-coupled.

According to one embodiment of the present invention, each micro pattern 20 formed in the optical sheet 100 may have a constant width or a constant pitch, but may not be limited thereto. FIG. 7B shows an array of micro prisms 20 having a constant pitch, and FIG. 8B shows an array of micro prisms 20 having a constant width.

According to one embodiment of the present invention, the BLU may be coupled by crossing the lenticular pattern or the prism pattern 31 of the light guiding plate 30 with the micro patterns 20 of the optical sheet 100, but may not be limited thereto.

According to one embodiment of the present invention, integrally forming the optical sheet 100 with the light guiding plate 30 may be performed by combining the light guiding plate 30 with the flat-top 21 of each micro pattern 20 formed in the optical sheet 100, but may not be limited thereto. For example, the BLU may be made by coupling the flat-top 32 of the lenticular pattern or the prism pattern 31 of the light guiding plate 30 with the flat-top 21 of the micro patterns 20 of the optical sheet 100, but may not be limited thereto.

In regard to this, FIG. 9 is a schematic diagram illustrating a structure in which a light guiding plate is coupled to an optical sheet by a crossing method, according to one embodiment of the present invention. As shown in FIG. 9, the BLU may be made by coupling the flat-top 32 of the lenticular pattern or the prism pattern 31 formed on the light guiding plate 30 with the flat-top 21 of the micro patterns 20 formed in the optical sheet 100, but may not be limited thereto.

The optical sheet 100, which will be coupled on the light guiding plate 30 on which the light trails 200 are formed, may have a side surface angle which determines angle distribution characteristics of emitted light, and a numerical value of a density of the micro patterns 20 and a numerical value of a width of the flat-top 21, which determine a luminance distribution of a backlight, as design factors. Specifically, design factors of the numerical values of the density of the micro patterns 20 and the width of the flat-top 21 are as follows.

1. An amount of light extraction is determined by an area of a light extraction window 201 and a density which are formed by a width of the flat-top 32 of the light trails 200 and the width of the flat-top 21 of each micro pattern of the optical sheet 100.

2. A distribution of an emitting angle of the extracted light is determined by a numerical value of a side surface angle of the optical sheet 100.

The BLU may have a structure of an array of the micro patterns 20 having a constant width or pitch based on the design factors, and may be coupled to be opposite the flat-top 32 of the micro lenticular pattern or the micro prism pattern 31 of the light guiding plate 30 in a face-to-face form.

In the BLU, light, which is incident on the inside of the light guiding plate 30 from a light source disposed on a side surface of the light guiding plate 30, may progress toward the inside of the light guiding plate 30 with barely any loss because the incident light corresponds to a total reflection condition on both top and bottom surfaces of the light guiding plate 30. Light, which is incident on the light extraction window 201 formed on a coupled portion of the light trails 200 and the optical sheet 100, may be extracted as it is without being reflected to the outside of the light guiding plate 30 by the micro patterns 20 formed in the optical sheet 100.

There are advantages in that the distribution of the emitting angle of the light guiding plate 30 may be determined by the side surface angle of each micro pattern 20, and a directional angle of the light guiding plate 30 may barely deviate from a direction perpendicular to a plane of the light guiding plate 30.

According to one embodiment of the present invention, integrally forming the optical sheet 100 with the light guiding plate 30 may be performed by a transparent adhesive, a thermal fusing, or a chemical fusing, but may not be limited thereto.

According to one embodiment of the present invention, the transparent adhesive may include any one selected from a group including a decompression adhesive, an optical transparent adhesive, an ultraviolet (UV) tape, an acrylic UV curing base material, and combinations thereof, but may not be limited thereto.

FIGS. 10A and 10B are schematic cross-sectional views illustrating BLUs according to one embodiment of the present invention. According to one embodiment of the present invention, as shown in FIGS. 10A and 10B, a BLU includes a light source 50, a light guiding plate 30 configured to guide light emitted from the light source 50, an optical sheet 100 integrally formed with the light guiding plate 30 and including micro patterns 20 configured to emit light reflected from the light guiding plate 30, a reflecting panel 60, and a diffusion film (not shown). The diffusion film may be omitted because light efficiency and characteristics of a light emission distribution of the light guiding plate 30 are excellent, but the present invention may not be limited thereto. When the light guiding plate 30 is a flat plate, the light source 50 may be disposed on one side or on both sides of the light guiding plate 30, and, although not shown, even when the light guiding plate 30 has a wedge shape in which a thickness of the light guiding plate 30 decreases toward an end of the light guiding plate 30, the light source 50 may be disposed on one side or on both sides of the light guiding plate 30. As the light source 50, a point light source such as a light emitting diode (LED) or a line light source such as a cold cathode fluorescent lamp (CCFL) may be used. Further, a plurality of point light sources may be used, or a unit for converting point light sources to a linear light source may be used together with the point light source. The reflecting panel 60 is disposed on a rear surface of the light guiding plate 30, and reflects light emitted toward the rear surface of the light guiding plate 30 toward an upper side of the light guiding plate 30. The reflecting panel 60 may simultaneously decrease the loss of light and enhance uniformity of light transmitted to the upper surface of the light guiding plate 30. The optical sheet 100 disposed on the upper side of the light guiding plate 30 serves to enhance luminance uniformity of light and broaden a viewing angle in addition to an inherent function of the optical sheet 100. Further, although not shown, a protection sheet may be additionally disposed on the upper side of the optical sheet 100 according to circumstances.

A second aspect of the present invention provides a display device including the BLU according to the first aspect.

The second aspect of the present invention relates to the display device including the BLU according to the first aspect, and detailed descriptions for portions overlapping the first aspect are omitted. However, content described in the first aspect of the present invention may be equally applicable even when the descriptions are omitted in the second aspect of the present invention.

The display device may include an LCD display device, an LED display device, electronic paper, or the like, but the present invention may not be limited thereto.

The display device may be fabricated by a method adopted in a general display process including a BLU, but may not be limited thereto.

According to one embodiment of the present invention, a bottom gap and a flat-top width of each micro pattern included in the BLU may be designed to be smaller than a pixel pitch of the display device, but may not be limited thereto.

FIG. 11 is a schematic diagram illustrating an optical sheet 100 in which micro patterns 20 having a pyramid shape are formed and structures of the micro patterns 20 for each position according to one embodiment of the present invention.

FIG. 12 is a schematic diagram illustrating an optical sheet 100 in which micro patterns 20 having a prism shape are formed and structures of the micro patterns 20 for each position according to one embodiment of the present invention.

As shown in FIGS. 11 and 12, a bottom gap V of each micro pattern denotes an arrangement gap between micro patterns 20 disposed on the optical sheet 100, a flat-top width W denotes a light extraction window and also denotes a width of a flat portion in contact with the light guiding plate 30. Further, each of the micro patterns 20 may have a shape in which both sidewalls of each micro pattern have an elevation angle A. The elevation angle A means a measured numerical value of a slope of each micro pattern based on the optical sheet 100.

When a pixel pitch of the LCD generally is in a range of about 0.2 mm to about 0.4 mm, the bottom gap V and the flat-top width W, for example, may be in a range of about 5 μm to about 400 μm but may not be limited thereto. The bottom gap V and the flat-top width W, for example, may be in a range of about 5 μm to about 400 μm, about 10 μm to about 400 μm, about 20 μm to about 400 μm, about 40 μm to about 400 μm, about 60 μm to about 400 μm, about 80 μm to about 400 μm, about 100 μm to about 400 μm, about 200 μm to about 400 μm, about 300 μm to about 400 μm, about 5 μm to about 300 μm, about 5 μm to about 200 μm, about 5 μm to about 100 μm, about 5 μm to about 80 μm, about 5 μm to about 60 μm, about 5 μm to about 40 μm, about 5 μm to about 20 μm, about 5 μm to about 10 μm, but may not be limited thereto.

According to one embodiment of the present invention, the optical sheet 100 may clearly eliminate micro pattern visibility and may prevent appearance of a Moire phenomenon according to a pitch gap of a display device by maintaining the bottom gap V of the micro patterns, which determines a pattern visibility, to be constant, but may not be limited thereto.

According to one embodiment of the present invention, because the pitch of the display device varies based on a screen size and a resolution of the display device, a range of limit values of the bottom gap V may be determined based on the screen size and the resolution of the display device, and may limit the limit values of the bottom gap V, which determine pattern visibility, within a pixel pitch value of a display device.

According to one embodiment of the present invention, when the flat-top width W of the micro patterns 20 is excessively large, the flat-top is recognized visually, and therefore a value of the flat-top width W may be smaller than that of the pixel pitch of the display device.

According to one embodiment of the present invention, a height H of the micro patterns 20 may vary according to a density of the micro patterns 20 based on a position of the optical sheet 100.

A difference of the height H of the micro patterns 20 based on positions of the micro patterns 20 may not have an effect on lamination and the like, and actually since the density does not abruptly change, a change of a value of the height H is slow such that these constraints may be satisfied, but the present invention may not be limited thereto.

A third aspect of the present invention provides a method of fabricating an optical sheet including forming dimples on a surface of a prototype mold, fabricating a replicated mold by replicating the prototype mold more than one time, and fabricating an optical sheet including a micro pattern using the replicated mold.

FIG. 13 is a schematic diagram illustrating a method of fabricating an optical sheet according to one embodiment of the present invention.

First, dimples are formed on a surface of a prototype mold to fabricate a first mold.

According to one embodiment of the present invention, the forming of the dimples on the surface of the prototype may include performing a method selected from punching, sealing, laser machining, and combinations thereof, but may not be limited thereto. By forming the dimples on a mold surface in a constant size through punching, sealing, and laser machining, in the mold fabrication, time and cost may be saved compared to a cutting process.

According to one embodiment of the present invention, the dimple may include one selected from a hemispherical shape, a spherical shape, a polygonal shape, and combinations thereof, but may not be limited thereto.

Then, the first mold is replicated more than one time to fabricate a replicated mold.

According to one embodiment of the present invention, the replicated mold may be formed of one selected from a metal, a UV curing resin, and combinations thereof, but may not be limited thereto. For example, the metal may be selected from a group including Ni, Pd, Sn, Ag, Co, and combinations thereof, but may not be limited thereto.

According to one embodiment of the present invention, the metal may be formed by an electrolysis deposition method or a non-electrolysis deposition method, but may not be limited thereto.

According to one embodiment of the present invention, forming the optical sheet may be performed by roll stamping or imprinting, but may not be limited thereto.

According to one embodiment of the present invention, the roll stamping may be performed at about 100° C. to 300° C., but may not be limited thereto. For example, the roll stamping may be performed at about 100° C. to 300° C., about 120° C. to 300° C., about 140° C. to 300° C., about 160° C. to 300° C., about 180° C. to 300° C., about 200° C. to 300° C., about 220° C. to 300° C., about 240° C. to 300° C., about 260° C. to 300° C., about 280° C. to 300° C., about 100° C. to 280° C., about 100° C. to 260° C., about 100° C. to 240° C., about 100° C. to 220° C., about 100° C. to 220° C., about 100° C. to 200° C., about 100° C. to 180° C., about 100° C. to 160° C., about 100° C. to 140° C., about 100° C. to 120° C., but may not be limited thereto.

In the present invention, an optical sheet may be fabricated using the replicated mold (hereinafter, referred to as a second mold) acquired by replicating the first mold about one time. The second mold may be fabricated using a UV curing resin, but may not be limited thereto. A second mold fabricated using a UV curing resin may be a sheet-shape mold for imprinting, and an optical sheet including micro patterns according to the present invention may be fabricated by mounting the second mold on an imprinting device, but may not be limited thereto.

In the present invention, an optical sheet may be fabricated using a replicated mold (hereinafter, referred to as a third mold) acquired by replicating the first mold about two times. The third mold may be fabricated by adhering a metal layer formed by an electrolysis deposition method or a non-electrolysis deposition on a stainless base material, but may not be limited thereto.

A thickness of the stainless base material may be in a range of about 0.1 mm to about 1 mm, and for example, about 0.1 mm to about 1 mm, about 0.1 mm to about 0.9 mm, about 0.1 mm to about 0.8 mm, about 0.1 mm to about 0.7 mm, about 0.1 mm to about 0.6 mm, about 0.1 mm to about 0.5 mm, about 0.1 mm to about 0.4 mm, about 0.1 mm to about 0.3 mm, about 0.1 mm to about 0.2 mm, but may not be limited thereto. The third mold is mounted on a roll-stamping device, and a roll in which the third mold is mounted is heated at about 100° C. to 300° C. Thereby, an optical sheet including micro patterns on a sheet or a panel having a thickness of about 0.1 mm to 3 mm may be fabricated, but may not be limited thereto. For example, the sheet or the panel may have a thickness of about 0.1 mm to 3 mm, about 0.1 mm to 2.8 mm, about 0.1 mm to 2.6 mm, about 0.1 mm to 2.4 mm, about 0.1 mm to 2.2 mm, about 0.1 mm to 2 mm, about 0.1 mm to 1.8 mm, about 0.1 mm to 1.6 mm, about 0.1 mm to 1.4 mm, about 0.1 mm to 1.2 mm, about 0.1 mm to 1 mm, about 0.1 mm to 0.8 mm, about 0.1 mm to 0.6 mm, about 0.1 mm to 0.4 mm, about 0.1 mm to 0.2 mm, but may not be limited thereto.

According to one embodiment of the present invention, the micro pattern may include a shape selected from a group including a plurality of truncated cone shapes, a plurality of pyramid shapes, a plurality of prism shapes, a plurality of lenticular shapes, and combinations thereof, but may not be limited thereto. The shape of the micro pattern may be various geometric shapes including a hemispherical shape and an intermediate shape of a hemispherical shape and a quadrangular pyramid shape. However, an area of a flat-top of the micro pattern should be smaller than an area of a base portion of the pyramid.

This written description sets forth the best mode of the invention. It should be understood by those skilled in the art that various modifications can be made without departing from the scope of the present invention and without changing its essential features. Therefore, the above-described embodiments should be considered in a descriptive sense only and not for purposes of limitation. For example, every element explained in a single form may be implemented in a distributed form, and similarly elements explained in the distributed form may be implemented in a coupled form.

The scope of the present invention is defined not by the detailed description but by the appended claims, and encompasses all modifications or alterations derived from meanings, the scope, and equivalents of the appended claims.

The invention claimed is:

1. A backlight unit for a display device, the backlight unit comprising:
   a light source;
   a light guiding plate configured to guide light emitted from the light source; and
   an optical sheet integrally formed with the light guiding plate and including a micro pattern configured to emit light reflected from the light guiding plate,
   wherein a bottom gap and a flat-top width of the micro pattern are designed to be smaller than a pixel pitch of the display device.

2. The backlight unit of claim 1, wherein the micro pattern includes a shape selected from a group including a plurality of truncated cone shapes, a plurality of truncated polypyramid shapes, a plurality of pyramid shapes, a plurality of prism shapes, a plurality of lenticular shapes, and combinations thereof.

3. The backlight unit of claim 1, wherein the micro pattern has a constant width or a constant pitch.

4. The backlight unit of claim 1, wherein the micro pattern includes a flat-top having a planar shape and a side surface having a constant angle.

5. The backlight unit of claim 4, wherein the side surface of the micro pattern has an elevation angle of 45° to 80°.

6. The backlight unit of claim 1, wherein the light guiding plate includes a non-patterned light guiding plate or a patterned light guiding plate.

7. The backlight unit of claim 6, wherein a pattern of the patterned light guiding plate includes a lenticular pattern or a prism pattern.

8. The backlight unit of claim 6, wherein the lenticular pattern or the prism pattern of the patterned light guiding plate includes a flat-top having a planar shape and a side surface including a planar shape having a constant slope or a curved surface shape.

9. The backlight unit of claim 1, wherein the optical sheet is integrally formed with the light guiding plate by crossing the light guiding plate with the optical sheet.

10. The backlight unit of claim 1, wherein the optical sheet is integrally formed with the light guiding plate by combining the light guiding plate with a flat-top of the micro pattern formed in the optical sheet.

11. The backlight unit of claim 1, wherein the optical sheet is integrally formed with the light guiding plate by using a transparent adhesive, thermal fusing, or chemical fusing.

12. The backlight unit of claim 11, wherein the transparent adhesive includes any one selected from a group including a decompression adhesive, an optical transparent adhesive, an ultraviolet (UV) tape, an acrylic UV curing base material, and combinations thereof.

13. A display device comprising:
   a backlight unit including:
      a light source;
      a light guiding plate configured to guide light emitted from the light source; and
      an optical sheet integrally formed with the light guiding plate and including a micro pattern configured to emit light reflected from the light guiding plate, wherein a bottom gap and a flat-top width of the micro pattern included in the backlight unit are designed to be smaller than a pixel pitch of the display device.

* * * * *